April 24, 1951   M. J. FLETCHER   2,549,792
CONTROL DEVICE FOR PROSTHETIC HANDS
Filed May 20, 1947   6 Sheets-Sheet 1
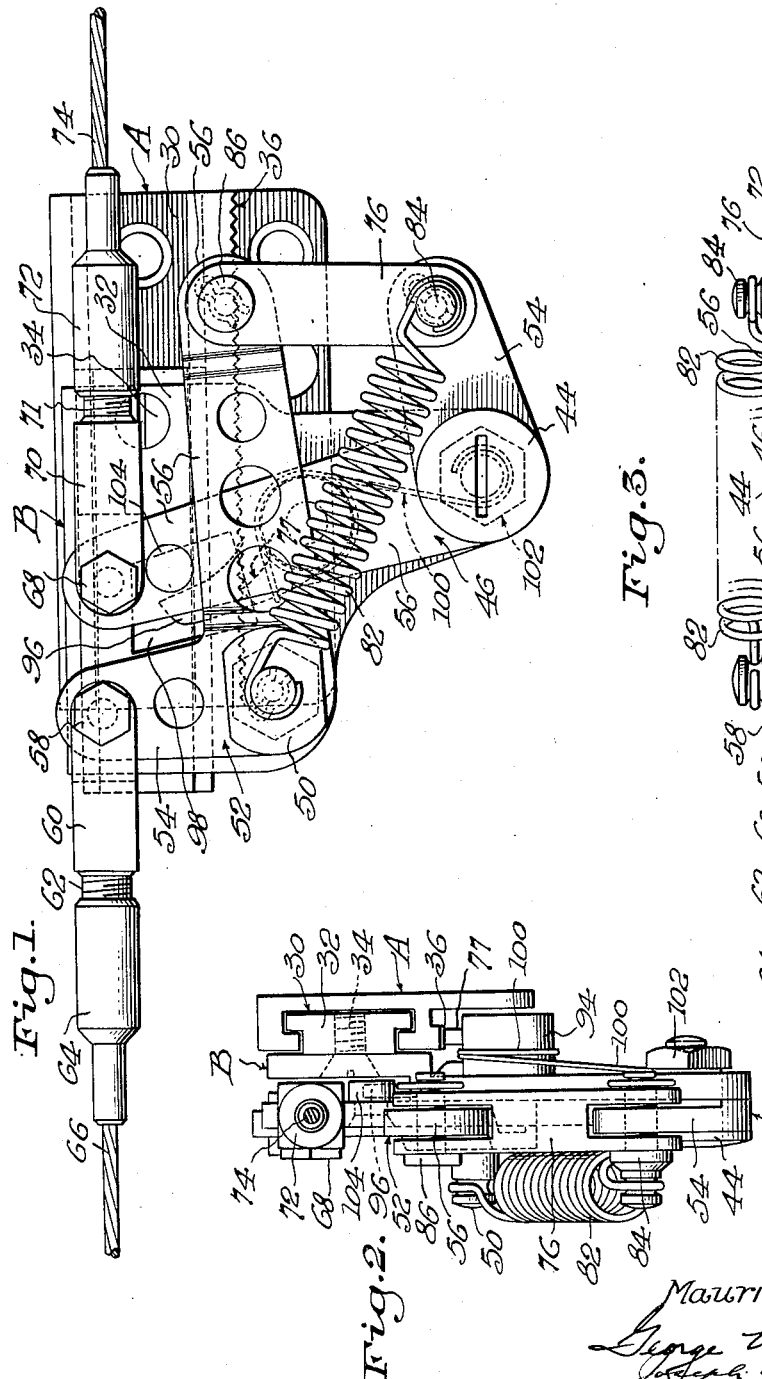
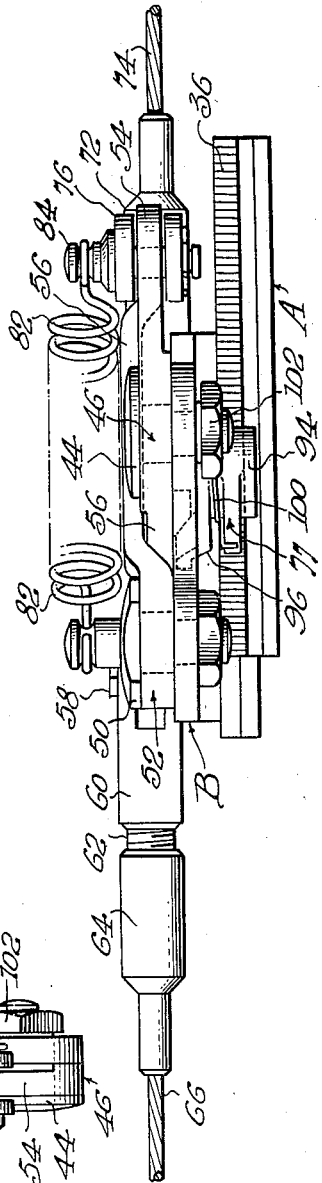
Inventor
Maurice J. Fletcher
Attorneys

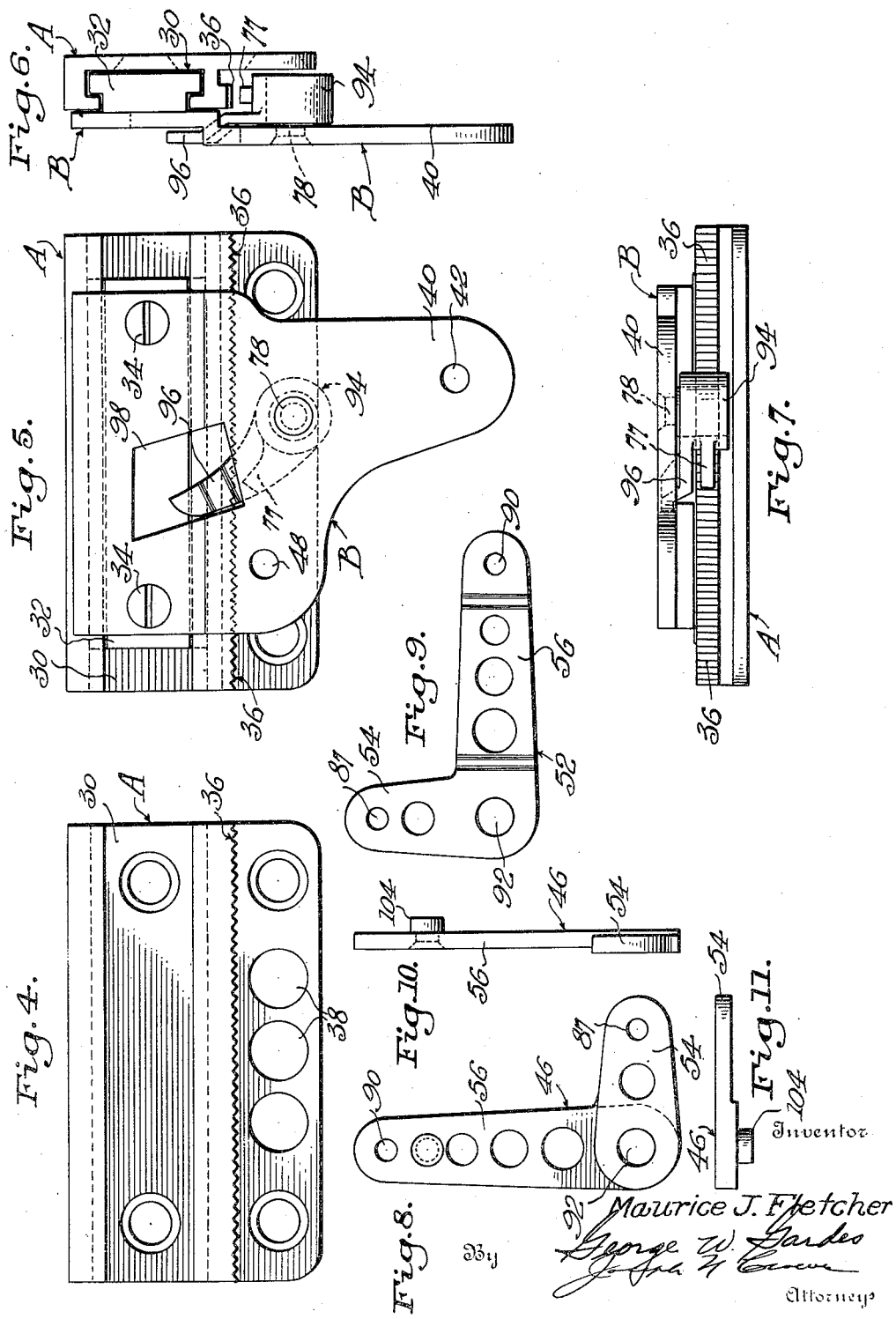

April 24, 1951  M. J. FLETCHER  2,549,792
CONTROL DEVICE FOR PROSTHETIC HANDS
Filed May 20, 1947  6 Sheets-Sheet 3
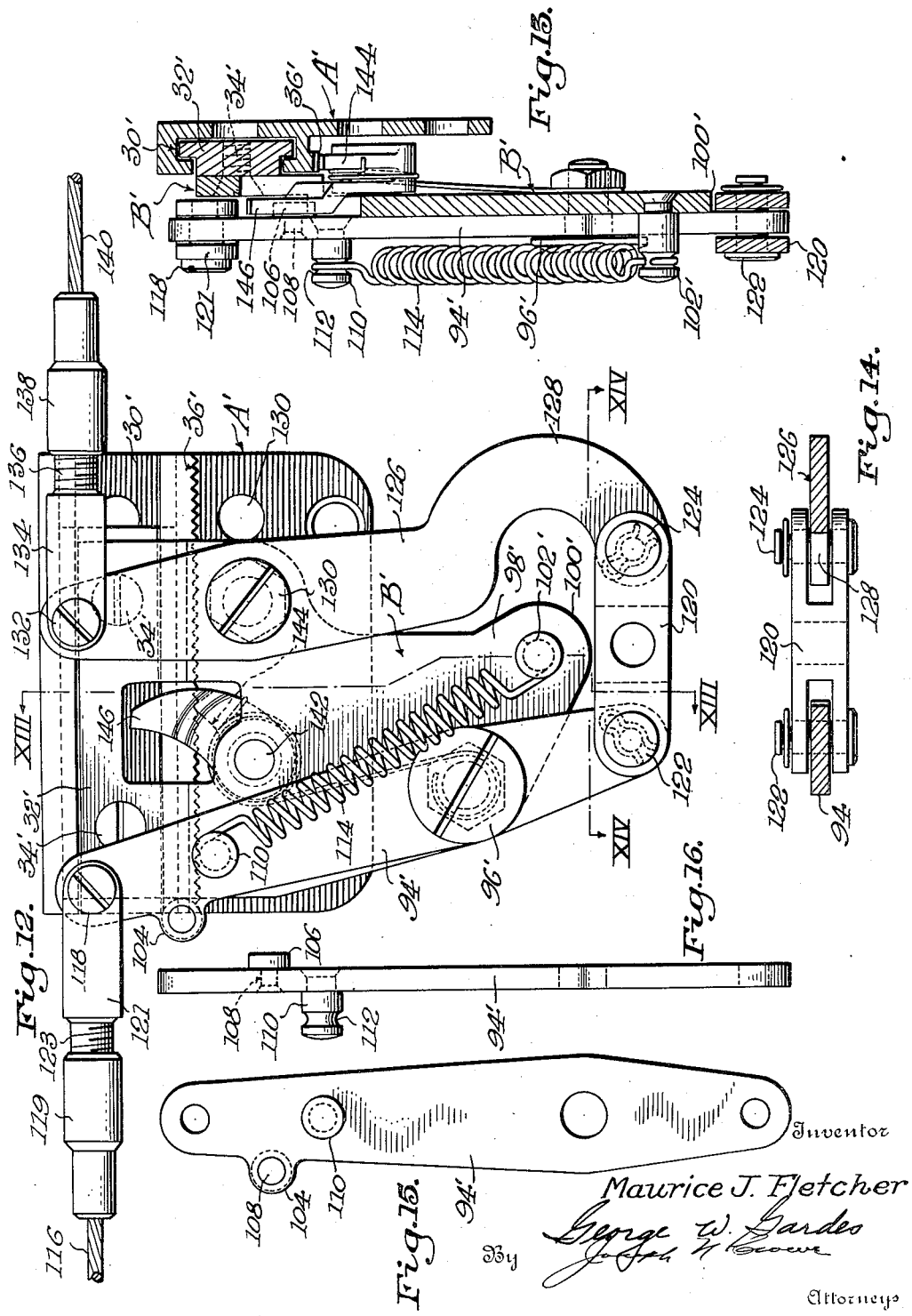
Inventor
Maurice J. Fletcher
By George W. Gardes
Joseph W. Crowe
Attorneys April 24, 1951 M. J. FLETCHER 2,549,792
CONTROL DEVICE FOR PROSTHETIC HANDS
Filed May 20, 1947 6 Sheets-Sheet 4
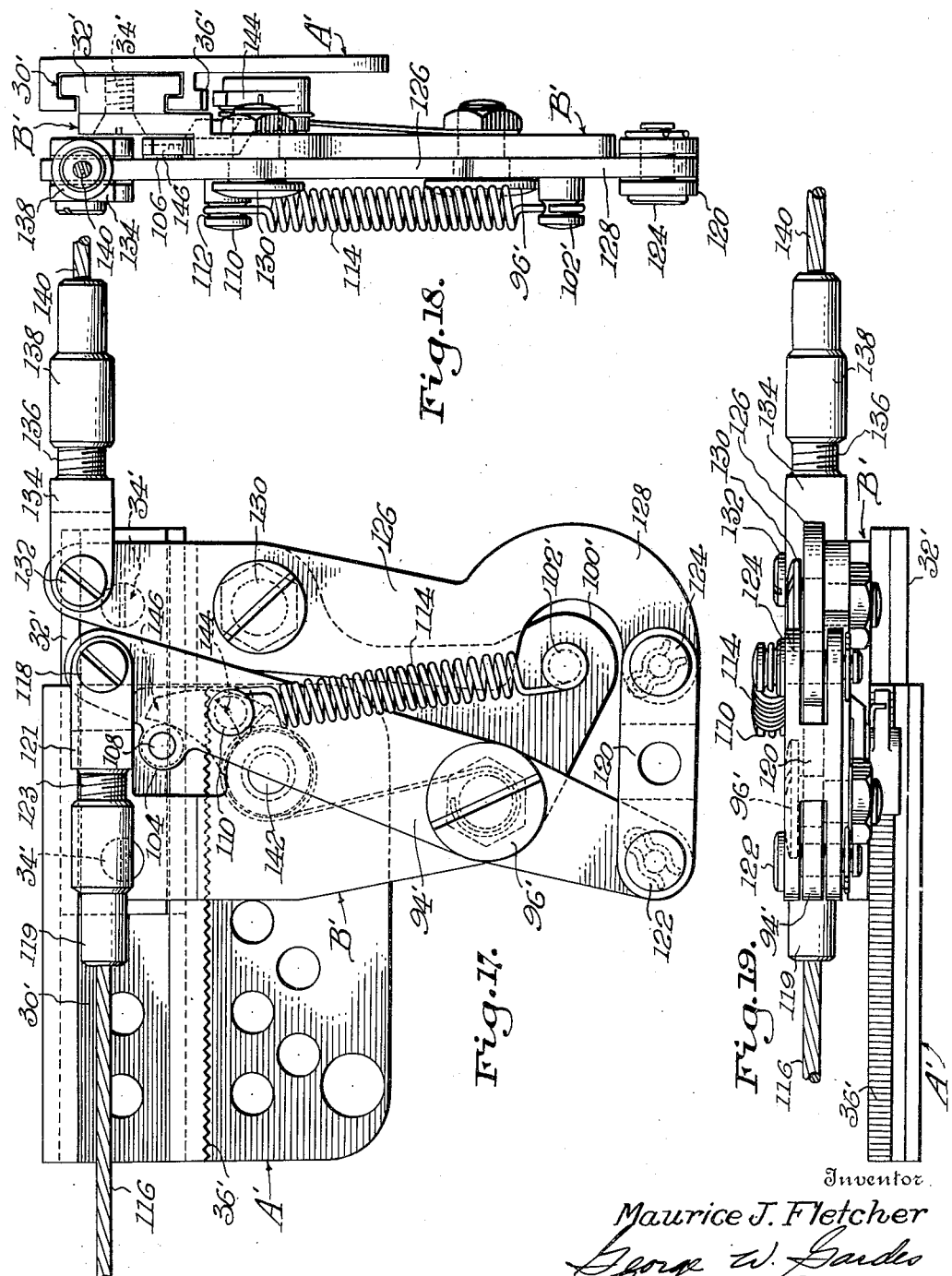
Inventor
Maurice J. Fletcher
By George W. Gardes
Attorneys April 24, 1951 M. J. FLETCHER 2,549,792
CONTROL DEVICE FOR PROSTHETIC HANDS
Filed May 20, 1947 6 Sheets-Sheet 5
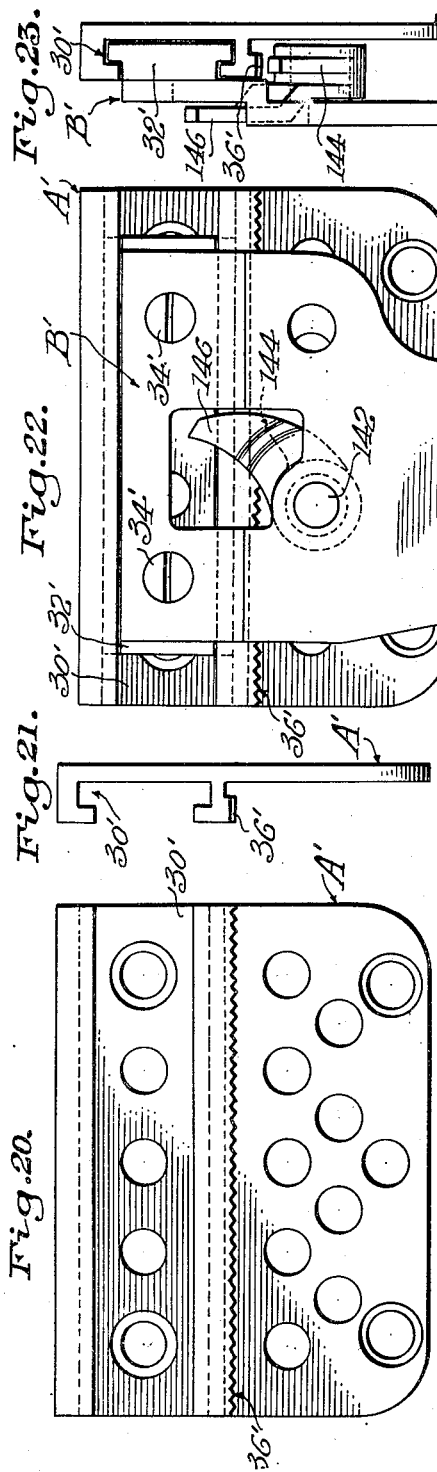
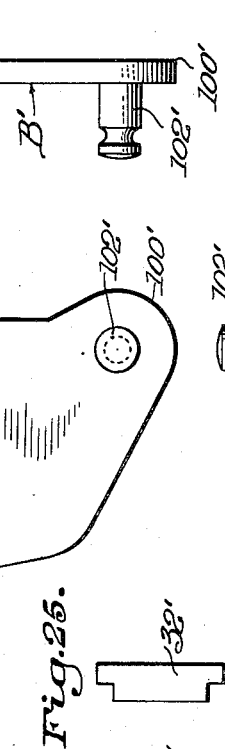
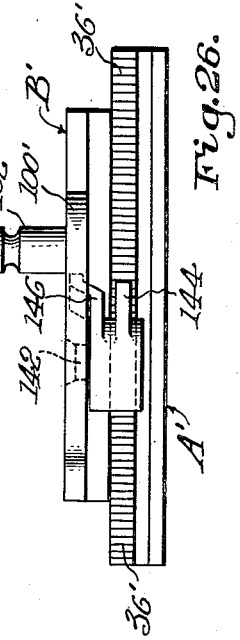
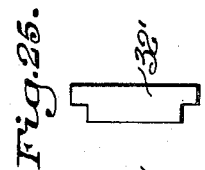
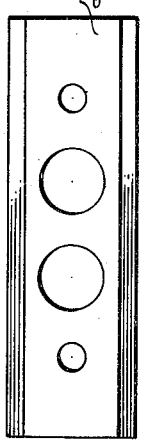
Inventor
Maurice J. Fletcher
By George W. Gardes
[signature]
Attorneys

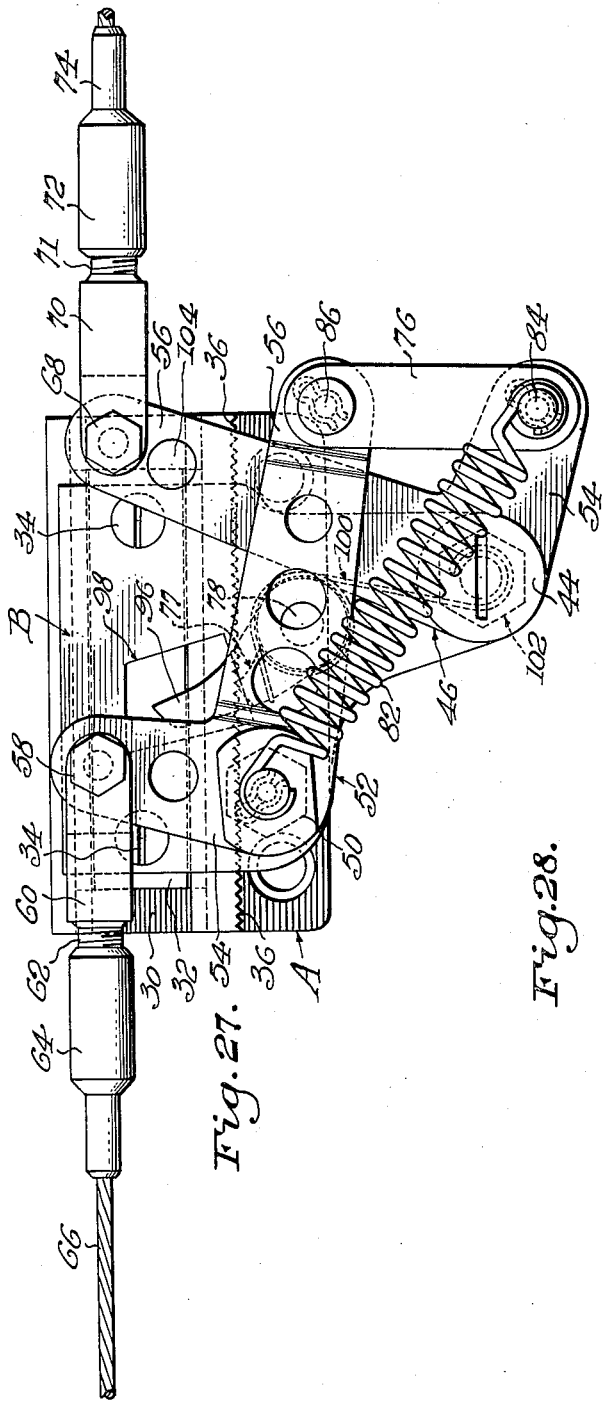
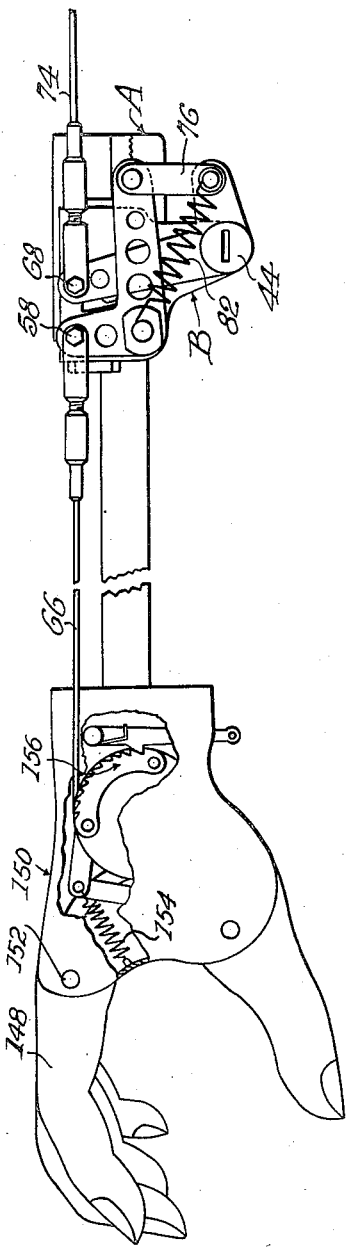

Patented Apr. 24, 1951

2,549,792

UNITED STATES PATENT OFFICE 2,549,792

CONTROL DEVICE FOR PROSTHETIC HANDS

Maurice J. Fletcher, Maxwell, Iowa, assignor to the United States of America as represented by the Secretary of War Application May 20, 1947, Serial No. 749,370

2 Claims. (Cl. 3—12)

(Granted under the act of March 3, 1883, as amended April 30, 1928; 370 O. G. 757)

The invention described herein may be manufactured and used by or for the Government for governmental purposes, without payment to me of any royalty thereon.

The present invention relates to actuating instrumentalities for prosthetic appliances, such as resilient articulated fingers of an artificial hand, for example, or for spring-actuated fingers for enabling improved operation of the said fingers and to impart sufficient strength to the fingers to enable ready picking up of objects grasped by the hand.

One of the principal impediments to the development of a satisfactory artificial hand has been the lack of strength of the hand at the fingertips. This commonly is called "fingertip pressure." Due to the difficulty of mechanically operating a finger through a relatively slender column, a great mechanical disadvantage is inherent within a finger, and most of the excursion and power for operation of the mechanical hand is taken up in attempting to close the hand against a tremendous mechanical disadvantage resulting in a very low fingertip pressure.

It has been the desire of prosthetic researchers to provide a fast-closing action of the hand until a predetermined pressure or load is impressed at the fingertips. At this time, it is desired that an automatic transmission be provided which will compound the leverage exerted at the fingertips without a great deal of exertion and excursion being wasted over the entire range of closure of the fingers.

Many difficulties have been experienced in attempting to realize this objective. Most attempts that have been made involve the use of gears and cables, but the use of gears has carried with it the burden of complication of mechanism and intolerable weight and has necessitated the use of flexible cables for the operation of the device.

In view of the stresses involved, these cables must be so large as to impair their flexibility, and consequently the cables are a source of continual annoyance and maintenance. Furthermore, the movement of all other force amplifiers known and tried out prior to the present development has been restricted as additional leverage could not be applied against a resilient object.

The present invention has for one of its principal objects the provisions of an improved force amplifier for prosthetic appliances such as artificial hands, which force amplifier can be imposed between an artificial hand and an operating mechanism, for permitting a fast "fanning" action of the fingers until a load is encountered, at which time it will change automatically to a compounded leverage, whereby a greatly increased grip is obtained at the fingertips without additional load being placed on the operating mechanism.

A further object of the present invention is to provide a force amplifier of the above-indicated type, which is of extremely simple and rugged construction and which requires no flexible cables, chains, pulleys, sheaves, or gears, and their attendant limitations.

A still further object of the invention is to provide a force amplifier of the above-indicated type that can be utilized between any type of power-closing and any type of source of actuating power, such as muscle motion, shoulder shrugs, electric motive power or hydraulic or pneumatic operating means.

A still further object of this invention is to provide a force amplifier of great strength and of extremely light weight, and one which can be replaced as a complete assembly.

A still further object of the invention is to provide a force amplifier for artificial hands or the like which permits extreme flexibility as to the point of mounting, whether that point of mounting be above-elbow, below-elbow or in the hand itself.

Further objects of the invention will become apparent as the description proceeds, and the features of novelty will be pointed out in particularity in the appended claims; and the invention consists in the construction, combination, and arrangement of the various parts of the device so that the objects contemplated are attained as will be more fully set forth and hereinafter pointed out in the claims, and illustrated in the accompanying drawings.

It may be pointed out before proceeding with the present invention that the basic principle of the force amplifier of the present invention is that of automatic force transmission in which a force is applied to one arm of a lever, and a resistance is applied to the other lever arm. When the entire mechanism has moved until the resistance has increased to a predetermined load, a slide bar in the force amplifier locks, and the balance of the force load then is compounded through the leverage and impressed upon the resistant factor. If the resistant end of the mechanism is locked by a ratchet or the like to prevent its returning, a return of the force portion of the device to its normal position and reapplication of the force will cause the device to act recurrently for obtaining a tighter grip or impressing further into the resistance factor. This "jacking" action is referred to hereinafter in the specification as "multiple excursion." This action will be clarified in the following specification when taken in conjunction with the appended drawings, wherein Fig. 1 is a side elevation of one form of force amplifying mechanism constructed in accordance with the present invention, for use in operating articulated fingers of an artificial hand;

Fig. 2 is an end elevation of the mechanism of Fig. 1, looking from the left as viewed in Fig. 1;

Fig. 3 is a bottom view of the apparatus of Fig. 1;

Fig. 4 is a side elevation of a base unit employed in the construction of the mechanism of Fig. 1;

Fig. 5 is a side elevation of an assembly of the base unit of Fig. 4 and a sliding carriage plate mounted upon and guided by the base unit;

Fig. 6 is an end view of the assembly of Fig. 5;

Fig. 7 is a bottom view of the assembly of Fig. 5;

Fig. 8 is a side elevation of one of the lever members employed in the construction of Fig. 1;

Fig. 9 is a side elevation of another of the lever members;

Fig. 10 is a side elevation of the lever member of Fig. 8, looking from the left as viewed in Fig. 8;

Fig. 11 is a bottom view of the lever member shown in Fig. 8;

Fig. 12 is a side elevation of a somewhat modified form of construction of the force amplifier of the present invention, the view showing the mechanism in open position;

Fig. 13 is a sectional elevation along the line XIII—XIII of Fig. 12, looking in direction of the arrows;

Fig. 14 is a sectional plan view along the line XIV—XIV of Fig. 12, looking in the direction of the arrows;

Fig. 15 is a front elevation of one of the lever members shown in Fig. 12;

Fig. 16 is a side elevation of the lever shown in Fig. 15;

Fig. 17 is a view similar to Fig. 12 but showing the mechanism in closed position;

Fig. 18 is an end view of the mechanism as viewed from the left in Fig. 17;

Fig. 19 is a bottom view of the assembly of Fig. 17;

Fig. 20 is a front elevation of a base plate employed in the modification of Fig. 12;

Fig. 21 is an end view of this plate, looking from the left as viewed in Fig. 20;

Fig. 22 is a front plan view of an assembly of base plate and slidable carriage plate, similar to the showing of Fig. 5, but illustrating the modified structure embraced in Fig. 12;

Fig. 23 is an end view of the assembly as viewed from the left in Fig. 22;

Fig. 24 is a front elevation of a slide member operating in the base plate of Fig. 20, to which slide the carriage plate of Fig. 22 is attached;

Fig. 25 is an end view of the slide of Fig. 24, viewed from the left in Fig. 24;

Fig. 26 is a bottom view of the assembly of Fig. 22;

Fig. 27 is a side elevation of the embodiment of the construction shown in Fig. 1, the construction being shown in open, or expanded, position;

Fig. 28 is a view indicating one manner of connecting the device of the present invention to an artificial hand.

Referring more particularly to the drawings, it will be observed that except for details of shape of the levers and the manner of connecting the levers together, the two modifications illustrated in the drawings are substantially identical in construction and operation. Hence, the same reference characters will be applied to like parts in both modified embodiments of the invention, except that the similar reference characters are primed in Figs. 12 through 26. Thus, reference character A represents a base portion or plate, and B is a movable carriage member or plate mounted on the base plate A and slidable relative thereto, as will be described in greater detail hereinafter.

The base plate A is provided with a T-slot running in the direction of movement of the device, this T-slot 30 accommodating a slide 32 that is secured to the carriage member B by screws 34. The base plate A has milled, on one of the marginal edges, a series of ratchet stops or teeth 36, as shown clearly in Fig. 4, for example, for a purpose which will be described hereafter. Base plate A is provided with a plurality of holes 38 as shown in the drawing for reducing the weight thereof, it being understood that the device of the invention is to be made as light as is consistent with strength, for maximum comfort to a user of a prosthetic hand. The slidable carriage unit B also may be provided with holes for weight reduction and for the reception of screw studs, as will be pointed out hereinafter. The slidable carriage unit B is provided with a dependent restricted portion 40, a hole 42 being present adjacent to the end of this restricted portion for the reception of a pivot stud 44 for a bell-crank lever 46. Also suitably located on the carriage unit B adjacent to the periphery thereof is a hole 48 for reception of a pivot stud 59 for a second bell-crank lever 52.

The bell-crank levers 46 and 52 are conveniently identical in size and shape, they having a short arm 54 and a long arm 56. Short arms 54 of lever 52 is pivotally connected at 58 to the outwardly extending shackle 60 having a threaded chuck portion 62 on which is threaded the adjustable turnbuckle 64 in which a rather stiff finger-operating cable or link 66 is secured.

The long arm 56 of the lever 46 is pivotally connected at 68 to shackle 70, which is identical with shackle 60 and has a threaded chuck portion 71 on which is received turnbuckle 72 in which a relatively stiff cable or link 74 is received and suitably locked. Cable 74 passes to a muscle motor or other source of energy, not shown, which may be of various types as will be mentioned hereinafter. Shackles 60 and 70 extend in opposite directions as shown. The long arm 56 of lever 52 and short arm 54 of the lever 46 are interconnected by a split link bar 76. As is indicated by Fig. 1, for example, short arm 54 of the levers is approximately half the length of the long arm 56 of the said levers, but this is not critical.

It will be noted also from the drawings that a ratchet pawl 77 is rotatably mounted on a stud 78 that passes through the slidable carriage plate B. This pawl is adapted to engage the teeth of the ratchet 36 at predetermined intervals or when predetermined force conditions are applied to the force-amplifying construction of the present invention. Also, a coil spring 82 is provided which is maintained in predetermined and preset tension between the stud 50 which forms the pivot point for lever 52 and the stud 84 which forms a pivot point for lever 46. This arrangement places the spring close to the pivot point of lever 46, so that the spring tension does not increase appreciably at any point in the movement between the levers 52 and 46; and these levers are so positioned that when a given force causes them to separate, the pawl 77 is forced into engagement with ratchet teeth 36. It will be observed that the connecting link 76 also is mounted on stud 84 and also on stud 86 in the end of long arm 56 of lever 52. Levers 46 and 52 obviously are provided with suitable holes 87 and 90 for the reception of such studs, and also with holes 92 for the fulcrum studs.

It will be noted that the pawl is carried by an enlarged head 94 of stud 78, the stud 78 being mounted on carriage plate B. This enlarged head 94 also carries an actuating pawl 96, which is longer than pawl 77, and which extends into the cut-out recess 98 in the carriage plate B. A spring 100 is coiled around the stud head 94, one end of the spring being held under nut 102 of fulcrum stud 44, the other end of which spring is secured to the pawl 96. Lever arm 56 carries a pin 104, which is adapted to engage the pawl 96 when tension on the cable 74 is released.

When the cable 74 is pulled, the pull is transmitted to lever arm 56, the arm 56 being pulled towards the right as viewed in Fig. 1, the parts assuming the position shown in Fig. 27 when fully open. This movement pulls the pin 104 away from engagement with the pawl 96, and also pulling the carriage plate B towards the right as viewed in Fig. 1, until the limit of movement of the levers is reached. The resulting movement of the levers stretches spring 82 and as the pin 104 pulls away from engagment with the pawl 96, the tension or the spring 100 turns the stud 78 until the pawl 77 is brought into engagement with the ratchet teeth 36. During this operation pivot 68 is pulled with an amplified force, the amount of which is dependent upon the effective lengths of the bell-cranks and the amount of movement permitted to the arms thereof. The amplified force transmitted through cable 66 to the hand 106, acts to close the fingers of the hand with sufficient strength to enable a desired object to be picked up by the wearer of the hand.

The engagement of pawl 77 with ratchet teeth 36 enables the use of the appliances to ease up somewhat on the pull exerted on cable 74, until the eased pull on the cable balances the pull of spring 82 without there being any change in the position of the parts, because of the locking engagement of the pawl with the ratchet teeth. However, when the pull of the spring 82 becomes effective, the pin 104 comes into pressing engagement with pawl 96 depressing the pawl 96 and also bringing pawl 77 out of engagement with the teeth 76 of the ratchet. The fingers of the hand may open because of their resiliency responsively to release of the cable 66, pulling the carriage member back to its original position. The provision of the rack and pawl structure permits a certain amount of relaxation on the part of the wear without releasing the grip of the fingers of the hand.

The second embodiment of the present invention is shown in Figs. 12 through 25, which embodiment differs from the precedingly-described form principally in the shape of the levers that produce the force amplification.

In Figs. 12 through 25, A' represents a base plate, and B' represents a movable carriage member or plate mounted on the base plate A and slidable relative thereto, as described previously above. The base plate A' and carriage plate B' are assembled and operated relative to each other as described above, the carriage plate B' being slidable relatively to the base plate when the fingers of the hand encounter a load.

In order to effect the relative movement between the carriage plate B' and the base plate A' the latter is provided with a T-slot 30' accommodating a slide 32' that is secured to the carriage B' by screws 34'. Also, as described above, the base plate A' is provided along the underside of the guide for the slide bar with a series of rack slots or teeth 36', as shown clearly in Fig. 20 for example, for a purpose similar to the rack teeth 36.

The input lever of this modification, see Fig. 12, for example, is a substantially straight lever member 94' that is fulcrumed on stud 96' which mounts lever 94' to the carriage plate B'. Stud 96' is secured to the plate B' adjacent to a corner of lower end 98' of the plate B', which lower end is off-set from the remainder of the plate and terminated in a substantial point 100', in the area of which point is mounted and secured a stud 102', for the purpose to be pointed out hereinafter.

The link 94' has an outwardly projecting lug 104 near the upper end thereof in which is mounted an inwardly projecting pin 106, the head portion of which is substantially larger than the shank portion 108 which is secured in the lug 104. At a suitable distance from the upper end of the link 94' and extending oppositely from the pin 106, there is mounted a second pin 110, having an annular groove 112 therein for receiving an end of coil spring 114, the other end of which spring is secured to the lug 102', so that the spring 114 is maintained under a predetermined and pre-set tension between the pin 110 and lug 102'.

At the upper end of link 94' there is secured the input assembly cable 116, this being the force input cable, the input assembly being similar in construction to that of the previously-described modification. The pivotal connection of the force input asembly is indicated at 118, the assembly comprising turnbuckle 119, shackle 121 and threaded chuck 123. Connected to the lower end of the lever 94' is a link 120, the connection being a pivot pin 122, which connects one end of the link 120 to the lower end of the lever 94'. Link 120 is pivotally connected at 123 to the lower end of lever 126, which has a curved portion 128 adapted to form a clearance for lower end 100' of the carriage plate B'.

The lever 126 is fulcrumed on pivot stud 130, which connects the lever 126 to the carriage plate B'. The upper end of the lever is pivotally connected at 132 to the output assembly including connection shackle 134, chuck 136 and turnbuckle 138, by means of which the cable 140 is adjusted as to tension. Stud 142 mounted in the carriage plate B' carries the pawls 144 and 146, pawl 144 being adapted to engage the rack teeth 36' when the device of the invention is in expanded position, and to be released therefrom when tension on the input cable 116 is released sufficiently to enable the spring 114 to release the carriage plate B' until pin 108 carried by the lever 94' engages the pawl 146, and turns this pawl, together with the stud 142 until the pawl 144 disengages the rack teeth 36', and the lever 94' and plate B' are brought by spring 114 into fully retracted position as shown in Fig. 17.

In the lever arrangements shown in the two modifications, the power output is substantially the same, the ratio of power output to power input being substantially four to one in both forms.

The construction of the present invention permits a "fanning" action of the fingers 148 pivoted to the hand 150, as indicated at 152, until a load encompassed by the fingers is met, at which time the carriage plate B, B' is held in position of its movement relative to the base A, A' at the first separation of the levers, and the leverage is compounded to gain strength at the output side at the expense of distance at the input. Upon release of the input power, the resiliency of the fingers opens them and returns the carriage plate to starting position. A spring 154, connected as shown, resiliently maintains the fingers normally in open position.

Where the hand 150 is provided with a finger lock mechanism 156 to prevent return movement of the fingers until desired which finger lock mechanism is provided in the output side of the improved device of the invention, a relaxation of the input motive power will cause the levers to return to position and take up the slack thus presented at the output end of the devices so that the carriage plate B, B' moves towards the input side a sufficient distance to permit the pawl (77, 144) to gain several notches, or teeth of the rack, at which time an additional movement of the motive source will actuate the levers again, thereby causing a "jacking action" to give additional movement at the finger tips under power.

The practical operation of the device (either modification) is as follows:

The spring (82 or 114) is pre-set for a given load or pressure at the fingertips. For example, suppose that it is desired that the fingers move freely until they encounter a load resistance of five pounds. Thus, where a five-pound load is encountered by the fingers, which are attached to the output side of the device, the spring will yield, causing the pawl (77 or 144) to engage the rack teeth (36 or 36') thereby preventing further movement toward the output side of the device, and the levers will compound to provide a force amplification. Both racks are silent in their operation. In both modifications, two levers are shown. These two levers have the advantage of continuing the direction of pull. One lever can be used, but due to restriction of space within an artificial hand, such an arrangement generally is inconvenient. There may be employed four, six, or any number of levers, the levers being linked together to obtain the leverage ratio desired between the input and output sides of the device, and these levers may be straight, as shown in the foregoing-described second modification of the construction, or they may be bent at their fulcrums to form bell-crank levers, as shown in the first modification to facilitate arrangement of the force amplifying device at any advantageous point in a prothesis. When the fingers are being opened or closed under no load, no action takes place between the levers and the whole carriage assembly slides freely on the base, giving, in effect, a single cable, rod, or connection between the input and the output.

The device of the present invention is rigid, simple in construction and does not require maintenance. It has been found that the complete device can be made to weight under two ounces, while still exerting a force in excess of 150 pounds on the output side of the device.

The device has other applications besides its use on artificial hands, and a variation of the device can be used as an elbow lift or can be used on mechanical devices of various types requiring a smooth-acting automatic force amplifier. The spring (82, 114) can be made so that its tension is adjustable and the guide track may be double or single to obtain the proper center of thrust, and the proper rigidity required for a specific use.

The force amplifier of the present invention can be used in conjunction with any type of force-closing mechanical hand, and can utilize any type of motive power, such as a shoulder sling, or hydraulic, pneumatic, or electric power, or with a muscle motor.

A sliding type of clutch (not shown) actuated by the levers in the same manner as the pawl presents an infinite number of locking points of the slidable carriage plate relative to the base plate, and gives greater efficiency to the "jacking action" which is generally called the "multiple excursion" characteristic of the device.

From the foregoing it will be apparent that the device of the present invention is capable of rather extensive modifications in structural details without departing from the spirit and scope of the invention and accordingly it will be understood that it is intended and designed to embrace within the scope of the invention such modification and changes as may be necessary to adapt it to varying conditions and use as defined by the appended claims.

Having thus described my invention, what I claim as new and wish to secure by Letters Patent is:

1. A control device for prosthetic hands, comprising a base member, a carriage member slidably mounted on the base member for slidable movement relative thereto, power-input means adapted to be connected to a source of power, power-output means connected to a prosthetic hand for operating the fingers thereof, a plurality of levers pivotally mounted on the carriage member, one of the levers being connected to the power-input means and thereby being the power-input lever, another of the said levers being connected to the power-output means and thereby being the power-output lever, the pivotal mountings of the levers constituting the fulcrum therefore, the power-input lever having a short arm between the power-input means and the fulcrum, and a long arm between the fulcrum and the other end of the lever, the power-output lever having a long arm extending between the power-input means and the fulcrum, a link interconnecting the long arm of the input lever to the short arm of the output lever, a spring attached to at least one of the levers and maintained under a pre-set tension, whereby upon application of power to the power-input means to operate the fingers of the hand, the carriage member with the levers mounted thereon, together with the power input means and the power output means, moves as a unit along the base member towards the source of input power without separation of the levers until the fingers engage a load, whereupon further application of power to the input means causes the levers to separate at the limit of movement of the carriage member, thereby producing a predetermined multiplication of power to the fingers thereby enabling the fingers to grasp and pick up the load, locking means effective at the end of the movement of the carriage member against return, and means carried by one of the levers for releasing the locking means responsively to return of the levers to closed position under action of the spring responsively to relaxation of input power, thereby permitting return of the carriage member responsively to the opening of the fingers to its original position.

2. A prosthetic appliance comprising, in combination, a prosthetic hand, a power-multiplying mechanism arranged to operate the fingers of the hand to flex the fingers forwardly towards the hand to close the fingers responsively to application of a predetermined input power to the said mechanism and to cause the fingers to grasp an object responsively to an increase in the input power, the said mechanism including a plurality of compounded levers adapted to predeterminedly multiply the input power and to convert the input power into predeterminedly multiplied output power to the said fingers, a carriage member for the levers and a base member for the carriage member, instrumentalities pivotally mounting the levers on the carriage members while permitting the levers to move relatively to the lever-mounting carriage, a rack on the base member, a pawl on the carriage adapted to engage the rack and to interlock therewith responsively to the carriage reaching its limit of movement towards the source of input power for preventing return of the carriage member responsively to the relaxation of the input power while permitting return of the levers to original position relative to the lever-mounting carriage, the said pawl being rotatably mounted on the carriage, an actuating pawl operatively associated with the locking pawl for releasing the locking pawl from engagement with the rack responsively to the levers assuming their original position, means carried by one of the levers for engaging and operating the actuating pawl for moving the locking pawl away from the locking position with the rack, and means in the said fingers operative responsively to relaxation of input power to the power-multiplying mechanism for opening the fingers and pulling the lever-mounting carriage and levers to original position relative to the base and hand.

MAURICE J. FLETCHER.

REFERENCES CITED

The following references are of record in the file of this patent:

UNITED STATES PATENTS

| Number | Name | Date |
| --- | --- | --- |
| 2,230,378 | Eberle | Feb. 4, 1941 |

FOREIGN PATENTS

| Number | Country | Date |
| --- | --- | --- |
| 111,073 | Great Britain | Nov. 15, 1917 |
| 315,024 | Germany | Sept. 22, 1919 |
| 828,272 | France | Feb. 7, 1938 |